United States Patent

Yonehara

[11] Patent Number: 5,511,065
[45] Date of Patent: Apr. 23, 1996

[54] MULTIPLEXING DEVICE CAPABLE OF QUICKLY TRANSMITTING A MONITORING INFORMATION

[75] Inventor: Akifumi Yonehara, Tokyo, Japan

[73] Assignee: NEC Corporation, Tokyo, Japan

[21] Appl. No.: 205,760

[22] Filed: Mar. 4, 1994

Related U.S. Application Data

[63] Continuation of Ser. No. 775,464, Oct. 15, 1991, abandoned.

[30] Foreign Application Priority Data

Oct. 15, 1990 [JP] Japan .................................. 2-273228

[51] Int. Cl.⁶ .............................. H04J 3/14; H04L 12/26
[52] U.S. Cl. ...................... 370/17; 370/92; 370/110.1; 370/111
[58] Field of Search ............................... 370/13, 13.1, 17, 370/92, 94.1, 110.1, 112, 111; 379/106; 340/825.06, 825.07, 825.52

[56] References Cited

U.S. PATENT DOCUMENTS

| | | | |
|---|---|---|---|
| 4,546,467 | 10/1985 | Yamamoto | 370/13 |
| 4,751,510 | 6/1988 | de Saint Michel et al. | 370/17 |
| 4,835,766 | 5/1989 | Arutalei et al. | 370/13.1 |
| 5,038,364 | 8/1991 | Motoori | 370/13.1 |

*Primary Examiner*—Hassan Kizou
*Attorney, Agent, or Firm*—Sughrue, Mion, Zinn, Macpeak & Seas

[57] ABSTRACT

A multiplexing device in a network system has an address number which is assigned to the multiplexing device. Through a reception line, the multiplexing device receives a reception signal which has a signal frame and carries a command signal in a predetermined area of the signal frame. The command signal carries a command and an address code. The multiplexing device comprises a first detecting section responsive to the command signal for detecting whether or not the address code is coincident with the address number to produce the detection signal when the address code is coincident with the address number and a second detecting section for detecting whether or not a vacant area exists in the signal frame to produce a location signal representative of a location of the vacant area when the vacant area exists in the signal frame. A producing section produces a response signal in response to the command carried by the command signal. A supplying section supplies the response signal to an entering section in response to the detection signal. Responsive to the location signal, the entering section enters the response signal in the vacant area to produce a transmission signal.

2 Claims, 3 Drawing Sheets

| M | T | U | F |

5,511,065

MULTIPLEXING DEVICE CAPABLE OF QUICKLY TRANSMITTING A MONITORING INFORMATION

This is a continuation of application Ser. No. 07/775,464, filed on Oct. 15, 1991, now abandoned.

BACKGROUND OF THE INVENTION

This invention relates to a multiplexing device for use in a network system.

A network system is known which comprises main and first through N-th multiplexing devices which are connected to each other in a cascade manner and which carry out communication by a multiplexed signal, where N represents a natural number. The main and the first through the N-th multiplexing devices have main and first through N-th address numbers which are different from each other. The network system further comprises a monitoring device connected to the main multiplexing device so as to monitor the main and the first through the N-th multiplexing devices.

On monitoring one of the main and the first through the N-th multiplexing devices, the monitoring device produces a command signal which includes a command of transferring monitor information from each of the multiplexing devices, together with an address code assigned to each of the multiplexing devices.

Responsive to the command signal given in the form of the multiplexed signal, each of the multiplexing devices produces a monitoring information signal when the address code is coincident with an address number assigned to each multiplexing device. Such a monitoring information signal is located in a prescribed time slot of the multiplexed signal by each multiplexing device to be sent back to the monitoring device.

However, it is impossible to transmit the monitoring information signal from a certain multiplexing device to the monitoring device in case where the prescribed time slot is already used or put in a busy state by another multiplexing device. Therefore, such a certain multiplexing device must inevitably wait for transmission of the monitoring informational signal to the monitoring device until the prescribed time slot becomes vacant or empty. As a result, it is difficult to quickly transmit the monitoring informational sign to the monitoring device.

SUMMARY OF THE INVENTION

It is therefore an object of this invention to provide a multiplexing device which is capable of quickly transmitting a monitoring information signal to a monitoring device.

Other objects of this invention will become clear as the description proceeds.

According to this invention, there is provided a multiplexing device having an address number which is assigned to the multiplexing device and comprising a receiving section for receiving a reception signal through a reception line and a transmitting section for transmitting a transmission signal to a transmission line, the reception signal having a signal frame and carrying a command signal in a predetermined area of the signal format, the command signal having a command an address code, the receiving section comprising first detecting means responsive to the command signal for detecting whether or not the address code is coincident with the address number to produce a detection signal when the address code is coincident with the address number, generating means responsive to the detecting signal for generating a monitoring information signal to supply the monitoring information signal to the transmitting section, and second detecting means for detecting whether or not a vacant area exists in the signal frame to produce a location signal representative of a location of the vacant area when the vacant area exists in the signal frame, the transmitting section comprising entering means responsive to the location signal for entering the monitoring information signal in the vacant area to produce the transmission signal.

DESCRIPTION OF THE PREFERRED EMBODIMENT

Figures 1, 2:
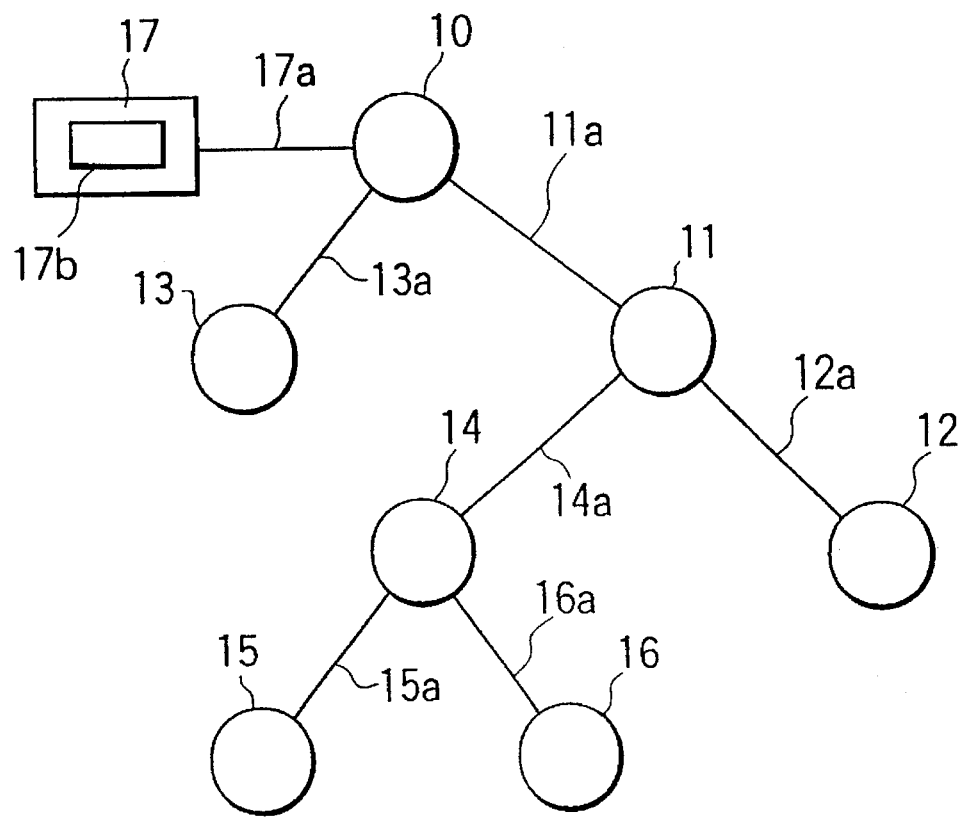
FIG. 1 is a diagram of a network system comprising a plurality of multiplexing device and a monitoring device.
FIG. 2 is a signal frame of a multiplexed signal used in the network system illustrated in FIG. 1.

Referring to FIG. 1, description will be made as regards a network system to which this invention is applicable and which comprises a plurality of multiplexing devices 10, 11 and 12 together with a plurality of communication units 13, 14, 15, and 16 and a monitoring device 17. For brevity of description, it is assumed that the communication units 13 through 16 are formed by multiplexing devices. The multiplexing devices 10 through 16 are located downstream or downwards relative to the monitoring device 17. In addition, the monitoring device 17. In addition, the monitoring device 17 is directly connected through a monitoring line 17a to the multiplexing device 10 which may be therefore called a main multiplexing device and which is located upstream or upwards relative to the remaining multiplexing devices 11 through 16. In FIG. 1, it is surmised that the multiplexing devices 11 through 16 may be referred to as first through sixth multiplexing devices, respectively.

Under the circumstances, the first multiplexing device 11 is connected through a communication line 11a to the main multiplexing device 10 while the second multiplexing device 12 is connected through a communication line 12a to the first multiplexing device 11. The communication lines 11a and 12a may be multiplex transmission lines. Likewise, the third and the fourth multiplexing devices 13 and 14 are connected to the main and the first multiplexing devices 10 and 11 through communication lines 13a and 14a, respectively, while the fifth and the sixth multiplexing devices 15 and 16 are connected to the fourth multiplexing device 14 through communication lines 15a and 16a, respectively.

Each of the multiplexing devices 10 through 16 is similar in structure and operation to one another, although their precise structure and operation are somewhat different from one another, as will become clear as the description proceeds. Under the circumstances, it is readily understood that each of the multiplexing devices 10 through 16 is operable to receive an input signal or input signals from upward or downward devices and to transmit an output signal our output signals to upward or downward devices. Each of the input and the output signals may be a multiplexed signal or a non-multiplexed signal.

Referring to FIG. 2 together with FIG. 1, it is assumed for a better understanding of this invention that the illustrated network system is operable as a conventional network system. For the time being, it suffices to say that the monitoring device 17 directly supplies the main multiplexing device 10 with a command signal which is indicative of transfer of monitor information from each multiplexing device 10 through 16 to the monitoring device 17. In this connection, the command signal includes an address code which specifies a destined one of the multiplexing devices.

The command signal may not be multiplexed on transmission from the monitoring device to the main multiplexing device 10 but the command signal should be multiplexed by each of the multiplexed devices 10 to 16 when it is transferred downstream. The destined multiplexing device transfers the monitoring information as a reply for response signal to the monitoring device 17 directly or indirectly. This shows that the response signal is multiplexed or is not multiplexed by the defined multiplexing device and is finally received by the monitoring device 17 in a non-multiplexed form.

Each of the input and the output signals has a predetermined format illustrated in FIG. 2 when it is transmitted through the communication lines 11a through 16a shown in FIG. 1. More specifically, the illustrated format has a predetermined length and includes a frame synchronization area F, a signal transmission area T, a monitoring information area M, and an unused or vacant area U. The frame synchronization area F and the signal transmission area T are given a frame synchronization signal and a transmission signal while the monitoring information area M is given the command signal or the response signal. The monitoring information area M has a fixed length.

From this fact, it is readily understood that the command signal or the response signal must be assigned to a predetermined location of each frame in each of the multiplexing devices of the conventional network system when such a signal is multiplexed. Wit this structure, the response signal may collide with one another at such multiplexing devices 11 and 10 when the response signal is collected from a plurality of the multiplexing devices. Such probability of collision of response signals becomes high when the multiplexing devices are located near to the monitoring device 17. In addition, the conventional network system has disadvantages, as pointed out in a preamble of the instant specification.

Figure 3:
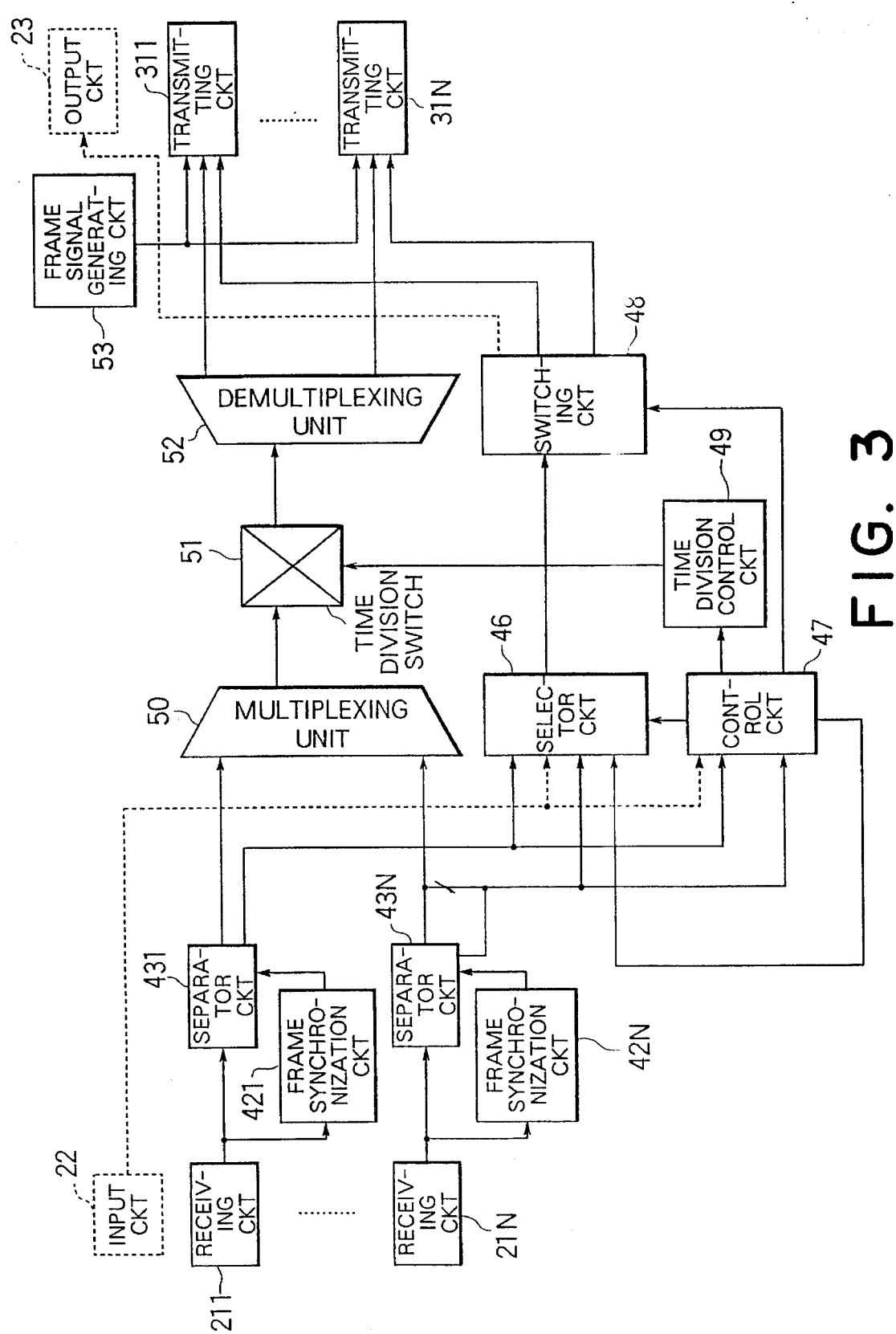
FIG. 3 is a block diagram of a multiplexing device according to an embodiment of this invention which is used in the network system illustrated in FIG. 1.

Referring to FIG. 3 together with FIG. 1, a network system according to an embodiment of this invention will be described which comprises a main multiplexing device 10, first through sixth multiplexing devices 11 through 16, and a monitoring device 17, as mentioned in conjunction with the conventional network system, although each of the multiplexing devices 10 through 16 are different from those illustrated in conjunction with the conventional network system. Herein, it is to be noted that a multiplexing device illustrated in FIG. 3 may be used either as the main multiplexing device 10 or a selected one of the first through the sixth multiplexing devices 11 to 16.

Like in the conventional network system, the monitoring device 17 comprises a command supply circuit 17 (b) (FIG. 1) for supplying the main multiplexing device 10 with the command signal which is identical with that illustrated in the conventional network system. In this connection, the command signal comprises a command indicative of transferring the response signal from each multiplexing device 10 to 16 to the monitoring device 17, together with the destined address code assigned to a destined one of the multiplexing devices 10 to 16.

In FIG. 3, let the multiplexing device be at first used as the main multiplexing device 10. The main multiplexing device 10 receives the input signal from the first and the third multiplexing devices 11 and 13 and the monitoring device 17 through the communication lines 11a and 13a and the monitoring line 17a, as illustrated in FIG. 1 on one hand and transmits the output signals to the first and the third multiplexing devices 11 and 13 and the monitoring device 17. The input signal supplied from the monitoring device 17 is not multiplexed and carries the command signal while the remaining input signal or signals are multiplexed in the illustrated example. Similarly, the output signal supplied to the monitoring device 17 is not multiplexed and carries the response signal while the remaining output signal or signals are multiplexed in the illustrated example.

Now, the main multiplexing device 10 comprises receiving circuits 211 to 21N which are equal in number to the communication lines 11a and 13a connected to the main multiplexing device 10, where N is a natural number, although only two of receiving circuits 211 and 212 are illustrated in FIG. 3. Each of the receiving circuits 211 and 212 receives the multiplexed input signal. The main multiplexing device 10 further comprises input and output circuits 22 and 23, respectively, illustrated in broken lines in FIG. 3. The input circuit 22 receives the command signal from the monitoring device 17. The output circuit 23 transmits the response signal to the monitoring device 17. Furthermore, the main multiplexing device 10 comprises transmitting circuits 311 to 31N each of which transmits the multiplexed output signal, frame synchronization circuits 421 and 42N, and separator circuits 431 to 43N, although only two sets of them are illustrated in FIG. 3.

The receiving circuits 211 to 21N are similar in structure and operation to one another. This applies to the transmitting circuits 311 to 31N, the frame synchronization circuits 421 to 42N, and the separator circuits 431 to 43N. Taking thin into consideration, description will be mainly directed to only one set of the receiving circuit 211, the frame synchronization circuit 421, and the separator circuit 431.

With this structure, the multiplexed input signals are sent through the receiving circuits 211 through 21N to the frame synchronization circuits 421 to 42N, respectively, and to the separator circuits 431 to 43N, respectively. Each of the separator circuits 431 to 43N separates the response signal from each multiplexed input signal to supply the same to both a selector circuit 46 and a control circuit 47 with reference to the frame synchronizing signal detected by the frame synchronization circuits 421 to 42N. In addition, each of the separator circuits 431 to 43N supplies a multiplexing unit 50 with an intermediate signal derived from each multiplexed input signal.

The control circuit 47 is responsive to the response signal and controls the selector circuit 46 so that the selector circuit 46 supplies the response signal as a selected signal to a switching circuit 48. The switching circuit 48 connects the selector circuit 46 to the output circuit 23 under the control of the control circuit 47 as will be described hereinafter. As a result, the selected signal is supplied from the output circuit 23 to the monitoring device 17 (FIG. 1) through the monitoring line 17a (FIG. 1).

The intermediate signals are multiplexed into a first internal multiplexed signal by the multiplexing unit 50. The first internal multiplexed signal is supplied to a time division switch 51. The time division switch 51 produces a second internal multiplexed signal from the first internal multiplexed signal in a time division fashion under control of a time division control circuit 49 to supply the second internal multiplexed signal to a demultiplexing unit 52. The demultiplexing unit 52 demultiplexed the second internal multiplexed signal into first and second local signals. The first and the second local signals are supplied to the transmitting circuits 311 and 312, respectively. The transmitting circuits 311 and 312 transmit the first and the second local signals as the output signals to the first and the third multiplexing devices 11 and 13, respectively, in accordance with a frame signal which is supplied from a frame signal generating circuit 53.

Figure 4:
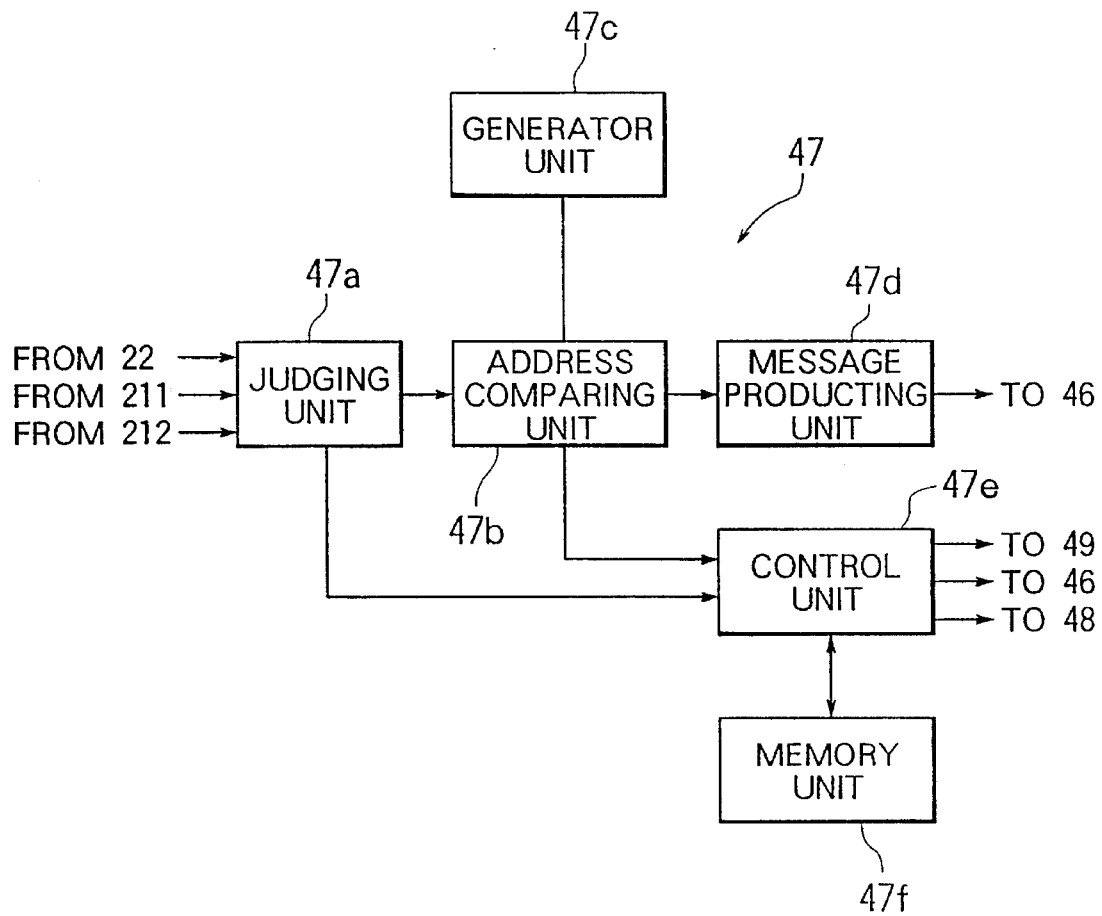
FIG. 4 is a block diagram of a control circuit used in a multiplexing device illustrated in FIG. 3.

Referring to FIG. 4 in addition to FIG. 3, description will be hereinafter made as regards the main multiplexing device 10. When the monitoring device 17 monitor a specific one of the main multiplexing device 10 and the first through the sixth multiplexing devices 11 to 16, the command supply circuit 17b supplies the main multiplexing device 10 with the command signal carrying a specific address code and the above-mentioned identification code. The command signal is received by the input circuit 22 to be supplied to the selector circuit 46 and the control circuit 47.

In FIG. 4, the control circuit 47 comprises a judging unit 47a, an address comparing unit 47b, an address generator unit 17c, a message producing unit 47d, a control unit 47e, and a memory unit 47f. The memory unit 47f may not be always used in the main multiplexing device 10, although such a memory unit 47f is necessarily used in each of the remaining multiplexing devices 11 to 16, as will be mentioned in conjunction with the first multiplexing device 11. The judging unit 47a judges whether a signal supplied to the judging unit 47a is the command signal or the response signal. Specifically, the command signal is sent to the address comparing unit 47b by the judging unit 47a when the signal is the command signal. When the signal is the response signal, the judging unit 47a delivers a judge result signal to the control unit 47e. The address generator unit 47c is for generating a main address number to supply the main address number to the address comparing unit 47b. The memory unit 47f is for memorizing an unused or vacant area information representative of the unused area U in the signal frame.

Supplied with the command signal, the address comparing unit 47b compares the specific address code with the main address number to detect whether or not the specific address code is coincident with the main address number. When the specific address code is coincident with the main address number, the address comparing unit 47b supplies the message producing unit 47d with the command carried by the command signal. Furthermore, the address comparing unit 47b supplies first detection signal to the control unit 47e. The message producing unit 47d produces a main message in accordance with the command to supply the selector circuit 46 (FIG. 3) with the main message as a main response signal.

The control unit 47e controls the selector circuit 46 (FIG. 3) in accordance with the first detection signal so that the selector circuit 46 supplies the main response signal to the switching circuit 48. The control unit 47e further controls the switching circuits 48 in accordance with the first detection signal so that the switching circuit 48 connects the selector circuit 46 to the output circuit 23. As a result, the main response signal is supplied to the output circuit 23. Thus, the main response signal is supplied from the output circuit 23 to the monitoring device 17 (FIG. 1).

When the specific address code is not coincident with the main address number, the address comparing unit 47b produces a second detection signal to supply the second detection signal to the control unit 47e. The control unit 47e controls the selector circuit 46 in accordance with the second detection signal so that the selector circuit 46 supplies the command signal to the switching circuit 48. Furthermore, the control unit 47e controls the switching circuit 48 in accordance with the second detection signal so that the switching circuit 48 connects the selector circuit 46 to the transmitting circuit 311 and 312. Thus, the command signal is delivered to the transmitting circuits 311 and 312. The transmitting circuits 311 and 312 allocate the command signal to the monitoring information area M in accordance with the frame signal to transmit the output signals to the first and the third multiplexing devices 11 and 13, respectively.

Otherwise, the judging unit 47a supplies the judge result signal to the control unit 47e when the signa supplied to the judging unit 47a is the response signal. Responsive to the judge result signal, the control unit 47e controls the selector circuit 46 so that the selector circuit 46 supplies the response signal to the switching circuit 48. The control unit 47e further controls the switching circuit 48 so that the switching circuit 48 connects the selector circuit 46 to the output circuit 23. As a result, the response signal is sent from the output circuit 23 to the monitoring device 17 (FIG. 1).

Referring to FIGS. 1 and 3, description will proceed to the first multiplexing device 11. In FIG. 3, the first multiplexing device 11 does not need the input and he output circuits 22 and 23 which are shown by broken lines in FIG. 3. Specifically, the first multiplexing device 11 is similar in structure to the main multiplexing device 10 except that the first multiplexing device 11 does not comprise the input and the output circuits 22 and 23. As described above, the first multiplexing device 11 is connected to the main multiplexing device 10, the second multiplexing device 12, and the fourth multiplexing device 14. Therefore, the first multiplexing device 11 comprises three receiving circuits 211 to 21N, three transmitting circuits 311 to 31N, frame synchronization circuits 421 to 42N, and separator circuits 421 to 432, although only two sets of them are illustrated in FIG. 3. The control circuit 47 of the first multiplexing device 11 in similar in structure to the control circuit 47 illustrated in FIG. 4.

The first multiplexing device 11 receives the multiplexing input signal at the receiving circuit 211. In the illustrated example, the multiplexed input signal is equivalent to the multiplexed output signal transmitted from the transmitting circuit 311 of the main multiplexing device 10. The multiplexed input signal carries the command signal. As described in conjunction with the main multiplexing device 10, the separator circuit 431 separates the command signal from the multiplexed input signal to supply the command signal to the selector circuit 46 and the control circuit 47 with reference to the frame synchronizing signal detected by the frame synchronization circuit 421.

Referring to FIG. 4 in addition to FIG. 3, description will be made as regards the control circuit 47 of the first multiplexing device 11. Supplied with the command signal, the judging unit 47a delivers the command signal to the address comparing unit 47b as described in connection with the main multiplexing device 10. In the first multiplexing device 11, the address generator unit 47c generates a first address number to supply the first address number to the address comparing unit 47b. When the specific address code carried by the command signal is coincident with the first address number, the address comparing unit 47b supplies the message producing unit 47d with the command carried by the command signal. The address comparing unit 47b further supplies the first detection signal to the control unit 47e. The message producing unit 47d produces a first message in accordance with the command to supply the selector circuit 46 with the first message as a first response signal.

The control unit 47e controls the selector circuit 46 in accordance with the first detection signal so that the selector supplies the first response signal to the switching circuit 48. The control circuit 47e further controls the switching circuit 48 in accordance with the first detection signal so that the switching circuit 48 connects the selector circuit 46 to the transmitting circuit 311 to deliver the first response signal to the main multiplexing device 10 (FIG. 1).

When the first detection signal is supplied to the control unit 47e, the control unit 47e accesses the memory unit 47f to know or detect a location of the unused area U in the signal frame. When the unused area U exists in the Signal frame, the control unit 47e supplies the time division control circuit 49 with a location signal which is representative of the location of the unused area U in the signal frame. Responsive to the location signal, the time division control circuit 49 controls the time division switch 51 so that the time division switch 51 produces the second internal multiplexed signal from the first internal multiplexed signal in time division fashion.

Inasmuch as the first multiplexing device 11 is communicable with the main, the second, and the fourth multiplexing devices 10, 12, and 14, the second internal multiplexed signal is demultiplexed into first, second, third local multiplexed signals by the demultiplexing unit 52. The first local multiplexed signal is supplied to the transmitting circuit 311. The transmitting circuit 311 allocates the first response signal to the unused area U in accordance with the frame signal supplied from the frame signal generating circuit 53. The transmitting circuit 311 supplies the main multiplexing device 10 with the multiplexed output signal which carries the first response signal.

Otherwise, the address comparing unit 47b supplies the second detection signal to the control unit 47e when the specific address code is not coincident with the first address number. The control unit 47e controls the selector circuit 46 in accordance with the second detection signal so that the selector circuit 46 supplies the command signal to the switching circuit 48. The control unit 47e further controls the switching circuit 48 in accordance with the second detection signal so that the switching circuit 48 connects the selector circuit 46 to the transmitting circuits 312 and 313. Thus, the command signal is supplied to the transmitting circuits 312 and 313. The transmitting circuits 312 and 313 allocate the command signal to the monitoring information area N in accordance with the frame signal to supply the second and the fourth multiplexing devices 12 and 14 with the multiplexed output signals each of which carries the command signal, respectively.

Each of the second through the sixth multiplexing devices 12 to 16 is similar in structure to the first multiplexing device 11. From the description in connection with the first multiplexing device 11, it is readily understood that each of the second through the sixth multiplexing devices 12 to 16 is operable in a manner similar to the first multiplexing device 11 when supplied with the multiplexing input signal carrying the command signal.

When the judge result signal is supplied from the judging unit 47a to the control unit 47e in the first multiplexing device 11, the control circuit 47e controls the selector circuit 46 in accordance with the judge result signal so that the selector circuit 46 supplies the switching circuit 48 with a response signal which is transmitted from one of the second, the fourth, the fifth, and the sixth multiplexing devices 12, 14, 15, and 16. The control unit 47e further controls the switching circuit 48 so that the switching circuit 48 connects the selector circuit 46 to the transmitting circuit 311. As a result, the response signal is delivered to the transmitting circuit 311.

In this event, the control unit 47e accesses the memory unit 47f to know or detect the location of the unused area U in the signal frame. When the unused area U exists in the signal frame, the control unit 47e supplies the time division control circuit 49 with the location signal. Responsive to the location signal, the time division control circuit 49 controls time division switch 51 so that the time division switch 51 produces the second internal multiplexed signal from the first internal multiplexed signal in time division fashion.

As described above, the second internal multiplexed signal is demultiplexed into the first through the third local multiplexed signals by the demultiplexing unit 52. The first multiplexed signal is sent to the transmitting circuit 311. The transmitting circuit 311 allocates the response signal to the unused area U in accordance with the frame signal. The transmitting circuit 311 supplies the main multiplexing device 10 with the multiplexed output signal which carries the response signal.

As readily understood in the above description, the fourth multiplexing devices 14 is operable in a manner similar to the first multiplexing device 11 when supplied with the multiplexing input signal carrying the response signal.

What is claimed is:

1. A multiplexing device having an address number which is assigned to said multiplexing device and comprising a receiving section for receiving a reception signal through a reception line and a transmitting section for transmitting a transmission signal to a transmission line, said reception signal having a received signal frame and carrying a command signal in a predetermined area of said received signal frame, said command signal carrying a command and an address code;

said transmission signal having a transmitting signal frame and carrying a response signal, said transmitting signal frame being equivalent to said received signal frame;

said receiving section comprising:

first detecting means responsive to said command signal for detecting whether or not said address code is coincident with said address number to produce a detection signal when said address code is coincident with said address number;

second detecting means responsive to said detection signal for detecting whether or not a vacant area exists in said received signal frame to produce a location signal representative of a location of said vacant area when said vacant area exists in said received signal frame;

producing means responsive to said command carried by said command signal for producing a monitoring information signal; and supplying means responsive to said detection signal for supplying said monitoring information signal to said transmitting section;

said transmitting section comprising:

entering means responsive to said location signal for entering said response signal in said vacant area of said transmitting signal frame to produce said transmission signal carrying said response signal.

2. A network system comprising a main multiplexing device having a main address number which is assigned to said main multiplexing device, a subsidiary multiplexing device having a subsidiary address number and communicable with said main multiplexing device, and a monitoring device communicable with said main multiplexing device for monitoring said main and said subsidiary multiplexing devices, said main multiplexing device comprising a main receiving section for receiving a main transmitting section for transmitting a transmission signal to a main transmission line, said subsidiary multiplexing device comprising a subsidiary receiving section for transmission signal as a subsidiary reception signal through said transmission line and subsidiary transmitting section for transmitting a subsidiary transmission signal through a subsidiary transmission line, said monitoring device comprising:

command supplying means for supplying said main multiplexing device with a command signal carrying a command and an address code;

said main receiving section comprising:

a reception terminal for receiving said command signal;

detecting means responsive to said command signal for detecting whether or not said address code is coincident with said main address number to produce a detecting signal when said address code is coincident with said main address number, said detecting means producing a non-detection signal when said address code is not coincident with said main address number; and producing means responsive to said command carried by said command signal for generating a monitoring information signal indicative of a result of monitoring said main multiplexing device;

said transmitting section comprising:

information supplying means responsive to said detection signal for supplying said monitoring information signal to said monitoring device; and multiplexing means responsive to said non-detection signal for multiplexing said reception signal and said command signal into a multiplexed signal to transmit said multiplexed signal as said transmission signal to said transmission line;

said subsidiary reception signal having a received signal frame and carrying said command signal in a predetermined area of said received signal frame;

said subsidiary transmission signal having a transmitting signal frame and carrying a response signal, said transmitting signal frame being equivalent to said received signal frame;

said subsidiary receiving section comprising:

first detecting means responsive to said command signal for detecting whether or not said address code is coincident with said subsidiary address number to produce a subsidiary detection signal when said address is coincident with said subsidiary address number;

second detecting means for detecting whether or not a vacant area exists in said received signal frame to produce a location signal representative of a location of said vacant area when said vacant area exists in said received signal frame;

subsidiary producing means responsive to said command carried by said command signal for producing a subsidiary monitoring information signal indicative of a result of monitoring said subsidiary multiplexing device; and subsidiary supplying means responsive to said subsidiary detection signal for supplying said subsidiary monitoring information signal as said response signal to said subsidiary transmitting section;

said subsidiary transmitting section comprising:

entering means responsive to said location signal for transmitting signal frame to produce said subsidiary transmission signal carrying said response signal.

* * * * *

UNITED STATES PATENT AND TRADEMARK OFFICE
CERTIFICATE OF CORRECTION

PATENT NO. : 5,511,065
DATED      : April 23, 1996
INVENTOR(S) : Akifumi Yonehara It is certified that error appears in the above-indentified patent and that said Letters Patent is hereby corrected as shown below:

Column 9, line 11, after "main" insert --reception signal through a main reception line and a main--.

Signed and Sealed this

Sixteenth Day of July, 1996

*Attest:*

BRUCE LEHMAN

*Attesting Officer*     Commissioner of Patents and Trademarks